US008406286B2

(12) United States Patent
Liu et al.

(10) Patent No.: US 8,406,286 B2
(45) Date of Patent: Mar. 26, 2013

(54) METHOD AND DEVICE FOR SELECTING BEST MODE OF INTRA PREDICTIVE CODING FOR VIDEO CODING

(75) Inventors: Jiaying Liu, Beijing (CN); Zongming Guo, Beijing (CN); Zhihui Zheng, Beijing (CN); Lieseng Yang, Beijing (CN)

(73) Assignees: Peking University Founder Group Co., Ltd., Beijing (CN); Beijing Founder Electronics Co., Ltd., Beijing (CN); Peking University, Beijing (CN)

( * ) Notice: Subject to any disclaimer, the term of this patent is extended or adjusted under 35 U.S.C. 154(b) by 390 days.

(21) Appl. No.: 12/671,048

(22) PCT Filed: Jul. 18, 2008

(86) PCT No.: PCT/CN2008/001343
§ 371 (c)(1),
(2), (4) Date: Jun. 28, 2010

(87) PCT Pub. No.: WO2009/015553
PCT Pub. Date: Feb. 5, 2009

(65) Prior Publication Data
US 2010/0290521 A1 Nov. 18, 2010

(30) Foreign Application Priority Data

Jul. 31, 2007 (CN) .......................... 2007 1 0119777

(51) Int. Cl.
*H04N 7/12* (2006.01)
(52) U.S. Cl. ....................................................... 375/240
(58) Field of Classification Search ................... 375/240
See application file for complete search history.

(56) References Cited

U.S. PATENT DOCUMENTS 6,195,388 B1 * 2/2001 Choi et al. ............... 375/240.05
(Continued)

FOREIGN PATENT DOCUMENTS

| CN | 1455600 A | 11/2003 |
|----|-----------|---------|
| CN | 1674680 A | 9/2005 |

(Continued)

OTHER PUBLICATIONS

Kim et al., "Multistage Mode Decision for Intra Prediction in H.264 Codec", Visual Communications and Image Processing, 2004, p. 355-363, vol. 5308.

(Continued)

*Primary Examiner* — Sath V Perungavoor
*Assistant Examiner* — Kehinde O Abimbola
(74) *Attorney, Agent, or Firm* — The Webb Law Firm (57) ABSTRACT

A method for selecting the best mode of intra prediction coding for video coding applied in video coding and decoding field is provided. The method includes: constructing a rate distortion cost function based on an estimated rate to be encoded; computing the rate distortion costs for all predictive modes by using the constructed function, and selecting the predictive mode with the minimum rate distortion cost as the best mode of intra prediction coding according to the computing result. Accordingly, a device for selecting the best mode of intra prediction coding for video coding is provided. By the method, the selected mode is closer to the best mode selected by original rate distortion optimization model, thereby the need to code every block actually in the process of rate distortion optimization is effectively avoided.

4 Claims, 4 Drawing Sheets

U.S. PATENT DOCUMENTS

| | | | |
|---|---|---|---|
| 6,421,467 B1* | 7/2002 | Mitra | 382/240 |
| 6,639,942 B1* | 10/2003 | Bayazit | 375/240.01 |
| 6,711,209 B1* | 3/2004 | Lainema et al. | 375/240 |
| 7,006,811 B2* | 2/2006 | Pukkila | 455/278.1 |
| 7,079,581 B2* | 7/2006 | Noh et al. | 375/240.16 |
| 7,453,937 B2* | 11/2008 | Henocq et al. | 375/240.03 |
| 7,764,740 B2* | 7/2010 | Seok et al. | 375/240.16 |
| 7,778,459 B2* | 8/2010 | Song | 382/166 |
| 7,856,053 B2* | 12/2010 | Chujoh | 375/240.01 |
| 7,916,783 B2* | 3/2011 | Gao et al. | 375/240.03 |
| 7,936,826 B2* | 5/2011 | Chen et al. | 375/240.25 |
| 7,957,600 B2* | 6/2011 | Yang | 382/232 |
| 8,045,587 B2* | 10/2011 | Park et al. | 370/474 |
| 8,094,711 B2* | 1/2012 | Tourapis et al. | 375/240.01 |
| 8,111,914 B2* | 2/2012 | Lee et al. | 382/166 |
| 8,130,828 B2* | 3/2012 | Hsu et al. | 375/240.03 |
| 8,155,181 B2* | 4/2012 | Han et al. | 375/240.01 |
| 8,155,190 B2* | 4/2012 | Imamura et al. | 375/240.13 |
| 8,160,141 B2* | 4/2012 | Auyeung | 375/240.13 |
| 8,160,150 B2* | 4/2012 | Moore | 375/240.16 |
| 8,170,102 B2* | 5/2012 | Bhaskaran et al. | 375/240.13 |
| 8,175,150 B1* | 5/2012 | Zhang et al. | 375/240.08 |
| 8,194,729 B2* | 6/2012 | Kim et al. | 375/240 |
| 8,204,114 B2* | 6/2012 | Wang et al. | 375/240.12 |
| 8,265,136 B2* | 9/2012 | Hong et al. | 375/240 |
| 8,290,045 B2* | 10/2012 | Ramachandran et al. | 375/240.16 |
| 2007/0053426 A1* | 3/2007 | Lee et al. | 375/240 |
| 2007/0121728 A1* | 5/2007 | Wang et al. | 375/240.18 |
| 2008/0112481 A1* | 5/2008 | Hsaing et al. | 375/240.03 |
| 2008/0232463 A1* | 9/2008 | Lu et al. | 375/240.02 |
| 2009/0274213 A1* | 11/2009 | Zhou et al. | 375/240.15 |
| 2011/0096832 A1* | 4/2011 | Zhang et al. | 375/240.08 |
| 2011/0243229 A1* | 10/2011 | Kim et al. | 375/240.13 |
| 2012/0039389 A1* | 2/2012 | Sjoberg et al. | 375/240.03 |

FOREIGN PATENT DOCUMENTS

| | | |
|---|---|---|
| CN | 1753500 A | 3/2006 |
| CN | 101141649 A | 3/2008 |
| EP | 2184925 A1 * | 5/2010 |

OTHER PUBLICATIONS

Cheng et al., "Fast Three Step Intra Prediction Algorithm for 4×4 blocks in H.264", Dept. Electronics Engineering, National Chiao-Tung University, Hsinchu, Taiwan, R.O.C., p. 1509-1512.

* cited by examiner

METHOD AND DEVICE FOR SELECTING BEST MODE OF INTRA PREDICTIVE CODING FOR VIDEO CODING

TECHNICAL FIELD

The present invention relates to the field of video coding, and particularly relates to a method and a device for selecting the best mode of intra prediction coding for video coding.

BACKGROUND

The video coding standard H.264/AVC is the latest video compression standard drafted by the Joint Video Team (JVT) established by the International Standardization Organization (ISO)/the International Electrotechnical Commission (IEC) and the International Telecommunication Union Telecommunication Standardization Sector (ITU-T). Compared with the preceding video compression standards, this standard has made remarkable improvements in the efficiency of video compression. Under the same Peak Signal to Noise Ratio (PSNR) quality, the code rate of H.264/AVC coder is reduced by approximately 50% compared with the code rate of MPEG-4 Advance Simple Profile (ASP).

In the design of H.264/AVC coder, a method of Rate Distortion Optimization (RDO) is adopted by both intra and inter predictions to perform decision. The object of introduction of this method is to select the best predictive mode from the possible combinations of all candidate predictive modes. The best coding mode selected based on rate distortion optimization means that in all possible mode combinations, a coding mode having the best video quality is selected in the condition of a given code rate, instead of simply minimizing the code rate or maximizing the video quality.

For an intra-4×4 prediction block, the best predictive mode corresponding to 16 pixels is determined by selecting the optimized rate distortion cost:

$$RDCost\_init = SSD(s,c,IMODE|Q_p) + \lambda_{MODE} \cdot R(s,c,IMODE|Q_p)$$

Wherein IMODE represents one of nine 4×4 block intra prediction modes; $Q_p$ represents the quantization parameter of a macro block; $\lambda_{MODE}$ represents the Lagrange multiplier; $R(\cdot)$ represents the bit number of the selecting mode corresponding to the required coding; $SSD(\cdot)$ represents the sum of square of the difference between the original 4×4 luminance block s and the reconstructed block c corresponding to each of the candidate mode. Wherein:

$$SSD(s, p) = \sum_{i=0}^{3} \sum_{j=0}^{3} (s_{ij} - c_{ij})^2$$

In each computing process of SSD, $c_{ij}$ is a reconstructed pixel value after being transformed, quantified, inversely quantified and inversely transformed. This means that the corresponding subblock is required to be coded each time when a to candidate mode is detected. The Discrete Cosine Transform (DCT), quantification and computing of entropy coding are very complex. Before the best predictive mode combination of a macro block is determined, the rate distortion cost for the combination of all chromaticity components and luminance components in the macro block should be repeatedly computed, that is, M8×(M4×16+M16), wherein is M8, M4 and M16 respectively represent the mode number of the chroma block prediction, the luminance block I4MB (intra-frame macro block 4×4 luminance manner) prediction and the I16MB (intra-frame macro block 16×16 luminance manner) prediction. This means that the rate distortion optimization process of a macro block should be computed 4×(9×16+4)=592 times, which results in that the complexity of the algorithm of the H.264 coder sharply increases. Thus, it is hard to apply this compression standard to a real time system with a low complexity processing capability, e.g. a mobile device.

In order to solve this problem, JM6.1d provides a new rate distortion cost function to improve the coding performance:

$$RDCost\_SAD = SAD(s,p) + 4P \cdot \lambda_{MODE}$$

Wherein the Sum of Absolute Differences (SAD) is computed by using the following formula:

$$SAD(s, p) = \sum_{i=0}^{3} \sum_{j=0}^{3} |s_{ij} - p_{ij}|$$

Wherein $p_{ij}$ is the $(i, j)^{th}$ element in the predictive block. When the predictive mode is the same as the most probable predictive mode, the factor P equals to 0, otherwise, it equals to 1 with respect to other modes.

This cost function greatly reduces the complexity of computing. However, since the SAD-based rate distortion cost function RDCost_SAD neglects the effect of the code rate, the SAD-based rate distortion cost RDCost_SAD is more different from the selected result of the cost value RDCost_init in the original rate distortion optimization model. Particularly, when comparing nine modes, if there is a trivial difference between the minimum SAD value and the second minimal SAD value, and the code rate corresponding to the minimum SAD is comparatively big, after multiplying with the constant coefficient $\lambda_{MODE}$, the mode selected by the original rate distortion optimization model will be different from the mode selected by the SAD-based rate distortion cost.

Meanwhile, the domestic and foreign scholars and researchers also propose some fast algorithms for the intra prediction mode determination in H.264/AVC. F. Pan et al. have proposed a rapid mode selecting algorithm based on local edge information. The local edge map of the block to be coded is determined by means of the Sobel operator, and corresponding edge histogram map is established, so, the rate distortion optimization cost is computed by selecting a mode based on the proximal edge direction.

C. C. Cheng has proposed a three-step rapid algorithm for the intra-4×4 prediction block. In the algorithm, in the first step, three most probable modes are initially compared, and they are the horizontal mode, the perpendicular mode and the Direct Coefficient (DC) mode respectively. In the second step, based on the probable mode determined in the first step, two modes at the adjacent directions are selected for further refining the direction. Finally, the rate distortion costs of all modes after the refinement are computed to determine the final mode.

C. S. Kim has proposed a solution of synthetically considering the characteristics of the target block spatial domain and the transform domain, and filtering out most of candidate modes by analyzing the relationship between the posterior error probability and average rate-distortion loss.

The main idea of theses methods is to select a mode in which is most relative with the gray direction in the block to be predicted. From the view of essence, it is to look for a mode having the minimum SAD compared with the block to be coded from the nine candidate predictive mode blocks, but the effect of the code rate in the rate distortion optimization cost function is not considered. In order to avoid the error caused by merely considering SAD, these rapid algorithms during designing usually rely on selecting much more candidate modes, e.g. two modes at the adjacent directions of the modes corresponding to the minimum SAD and DC mode, to compute the rate distortion optimization cost.

SUMMARY

The present invention provides a method and a device for selecting the best mode of intra prediction coding for video coding, thereby the problems of a difficulty in ensuring the selection of intra prediction mode to be close to the best mode selected by the original rate distortion optimization model, and the high computing complexity of repeatedly calculating the coding rate of the block in each predictive mode in the prior art are solved.

The present invention provides a method for selecting the best mode of intra prediction coding for video coding, including the following steps:

constructing a rate distortion cost function based on an estimated rate to be encoded;

computing the rate distortion cost for all predictive modes by using the constructed function, and selecting the prodictive mode with the minimum rate distortion cost as the best mode of intra prediction coding based on the computing results.

The step of constructing a rate distortion cost function based on an estimated rate to be encoded specifically includes the following steps:

computing to estimate the residual error after intra prediction of the block to be coded;

computing the estimated rate of the block to be coded;

constructing the rate distortion cost function based on the estimated rate to be encoded by using the estimated residual error of the block to be coded as the distortion measurement, together with the estimated rate of the block to be coded.

The step of computing the estimated rate of the block to be coded specifically includes the following steps:

estimating the numbers of zero coefficients and ±1 coefficients comprised in the coefficients of the block to be coded after DCT and quantification during practical coding, based on the estimated residual error of the block to be coded;

predicting the estimated rate of the block to be coded, according to the characteristic of the Context-based Adaptive Variable Length Coding (CAVLC) method together with the estimated numbers of zero coefficients and ±1 coefficients.

The predictive mode is a valid predictive mode.

The present invention further provides a device for selecting the best mode of intra prediction coding for video coding, including:

a rate distortion cost function constructing unit for constructing a rate distortion cost function based on an estimated rate to be encoded;

a rate distortion cost computing unit for computing the rate distortion costs for all predictive modes based on the rate distortion cost function constructed by the rate distortion cost function constructing unit;

an intra prediction coding best mode selecting unit for selecting the predictive mode with the minimum rate distortion cost as the best mode of intra prediction coding based on the result obtained by the computation of the rate distortion cost computing unit.

The rate distortion cost function constructing unit further includes:

an estimated residual error computing subunit for computing to estimate residual error after intra prediction of the block to be coded;

an estimated rate to be encoded computing subunit for computing the estimated rate of the block to be coded;

a rate distortion cost function generating subunit for constructing a rate distortion cost function based on the estimated rate to be encoded by using the estimated residual error of the block to be coded obtained by the computation of the estimated residual error computing subunit as the distortion measurement, together with the estimated rate of the block to be coded obtained by the computation of the estimated rate to be encoded computing subunit.

The estimated rate to be encoded computing subunit further includes:

a coefficient estimating subunit for estimating the numbers of zero coefficients and ±1 coefficients comprised in the coefficients of the block to be coded after DCT and quantification during practical coding, based on the estimated residual error of the block to be coded obtained by the computation of the estimated residual error computing subunit;

a code rate predicting subunit for predicting the estimated rate of the block to be coded according to the characteristic of the Context-based Adaptive Variable Length Coding (CAVLC) method together with the numbers of zero coefficients and ±1 coefficients estimated by the coefficient estimating subunit.

The predictive mode is a valid predictive mode.

The present invention constructs a new rate distortion cost function which employs simple computing means and synthetically refers to the effects of the quantized residual error value and the estimated rate to be encoded with respect to the mode selection, by directly estimating the residual error value between the predictive block and the pixel corresponding to the original block to be coded to predict the numbers of zero coefficients and ±1 coefficients comprised in the quantified DCT coefficients, and further by predicting the code rate required by the coding according to the predicted numbers together with the characteristic of the Context-based Adaptive Variable Length Coding (CAVLC) method, and by synthetically considering the distortion measurement SAD and the estimated rate to be encoded. Therefore, based on the fact that the mode selection in the present invention is closer to the best mode selected by the original rate distortion optimization model, the need to code every block actually in the process of the rate distortion optimization is effectively avoided, and the coding efficiency is greatly improved in the condition that the code rate and PSNR of coding and all direction search method change little.

DETAILED DESCRIPTION

The present invention provides a method for selecting the best mode of intra prediction coding for video coding. Based on the fact that the mode selection in the present invention is closer to the best mode selected by the original rate distortion optimization model, the need to code every block actually in the process of the rate distortion optimization is effectively avoided, and the coding efficiency is greatly improved in the condition that the code rate and PSNR of coding and all direction search method change little.

Figure 1:
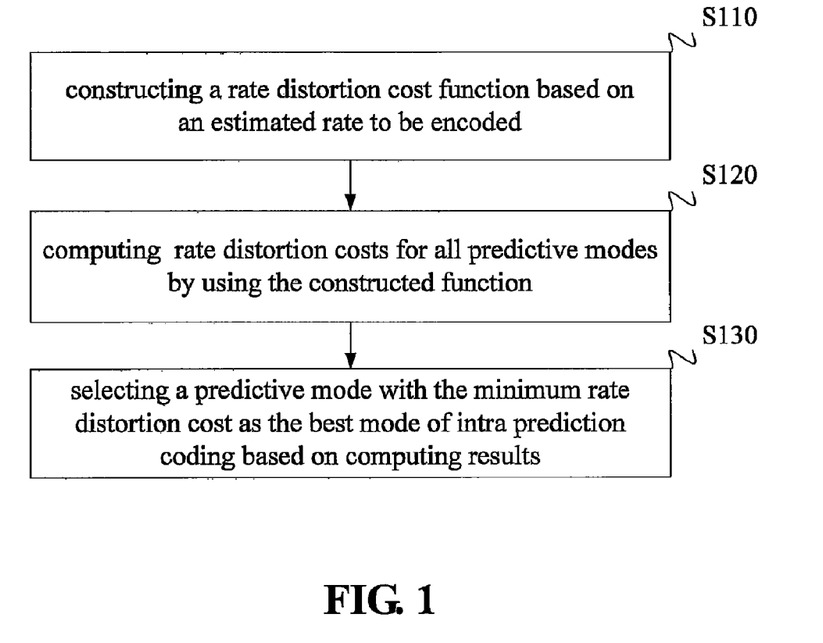
FIG. 1 is a flow chart of realizing a method for selecting the best mode of intra prediction coding for video coding in the present invention.

As shown in FIG. 1, it is a flow chart of realizing a method for selecting the best mode of intra prediction coding for video coding in the present invention, comprising the following steps:

S110: constructing a rate distortion cost function based on an estimated rate to be encoded;

S120: computing the rate distortion costs for all predictive modes by using the constructed function, and S130: selecting a predictive mode with the minimum rate distortion cost as the best mode of intra prediction coding based on the computing result.

Figure 2:
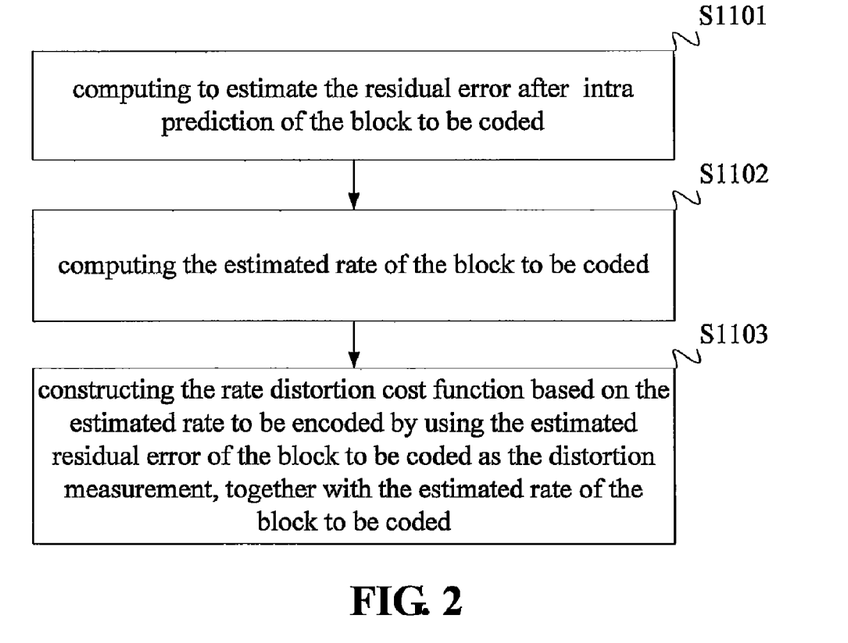
FIG. 2 is a flow chart of constructing a rate distortion cost function based on an estimated rate to be encoded in the present invention.

As shown in FIG. 2, it is a flow chart of constructing a rate distortion cost function based on an estimated rate to be encoded in the present invention, comprising the following steps:

S1101: computing to estimate the residual error after intra prediction of the block to be coded;

S1102: computing the estimated rate of the block to be coded;

S1103: constructing the rate distortion cost function based on the estimated rate to be encoded by using the estimated residual error of the block to be coded as the distortion measurement, together with the estimated rate of the block to be coded.

Figure 3:
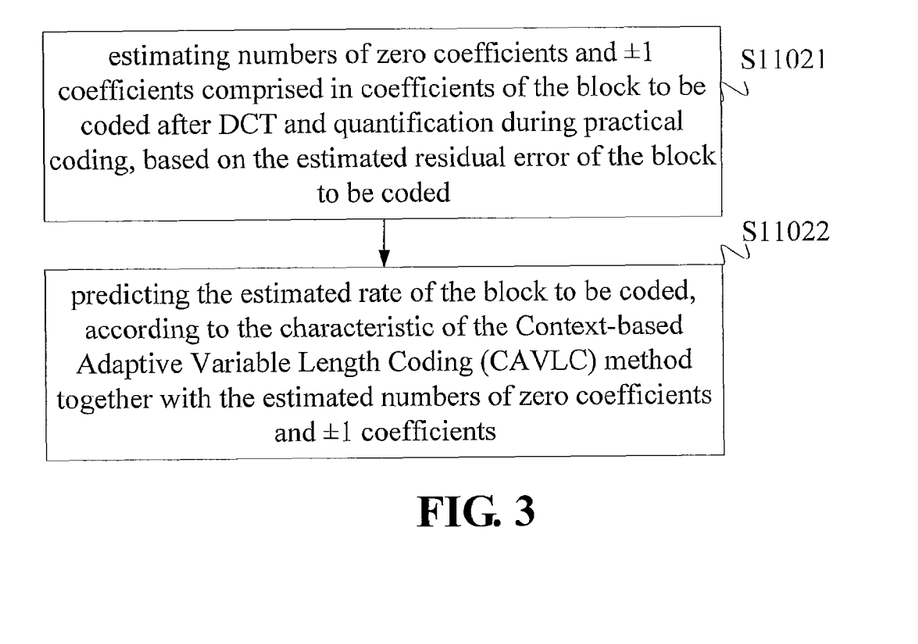
FIG. 3 is a flow chart of computing the estimated rate of the block to be coded in the present invention.

As shown in FIG. 3, it is a flow chart of computing the estimated rate of the block to be coded in the present invention, comprising the following steps:

S11021: estimating numbers of zero coefficients and ±1 coefficients comprised in the coefficients of the block to be coded after DCT and quantification during practical coding, based on the estimated residual error of the block to be coded;

S11022: predicting the estimated rate of the block to be coded, according to the characteristic of the Context-based Adaptive Variable Length Coding (CAVLC) method together with the estimated numbers of zero coefficients and ±1 coefficients.

The following preferred embodiment of the selection of the best mode of intra prediction coding for an H.264/AVC 4×4 block according to the present invention is described by reference of the drawings of the Description:

The selection is implemented on the reference software verification model JM8.6 coder. The detailed working environment is a PC with Intel Pentium D 2.80 GHz processor, 1 GB DDR RAM, and Microsoft Windows 2003 Server. Main Profile of JVT is used as the configuration file, and the main parameters of which are shown as follows:

1) the movement vector MV searching scope is ±16 pixel value;
2) using the rate distortion optimization;
3) the reference frame number is set to 0;
4) the entropy coding mode is CAVLC;
5) the precision of the movement vector MV is ¼ pixel;
6) the GOP structure is a full I frame structure.

The method for selecting the best mode of intra prediction coding for an H.264/AVC 4×4 block in the present invention, comprising the following steps:

S1100: selecting valid predictive modes from nine luminance predictive modes based on valid reference pixel value, and performing intra prediction coding for 16 pixels in the original block s to be predicted respectively to obtain the predictive block p.

Figure 4:
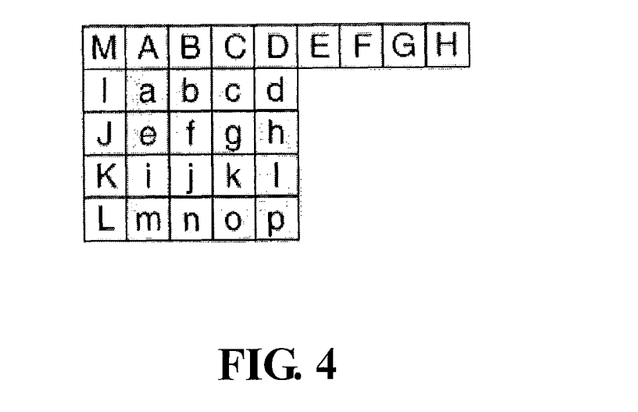
FIG. 4 is a schematic diagram of the block to be predicted and reference pixel in the embodiments of the present invention.
Figure 5:
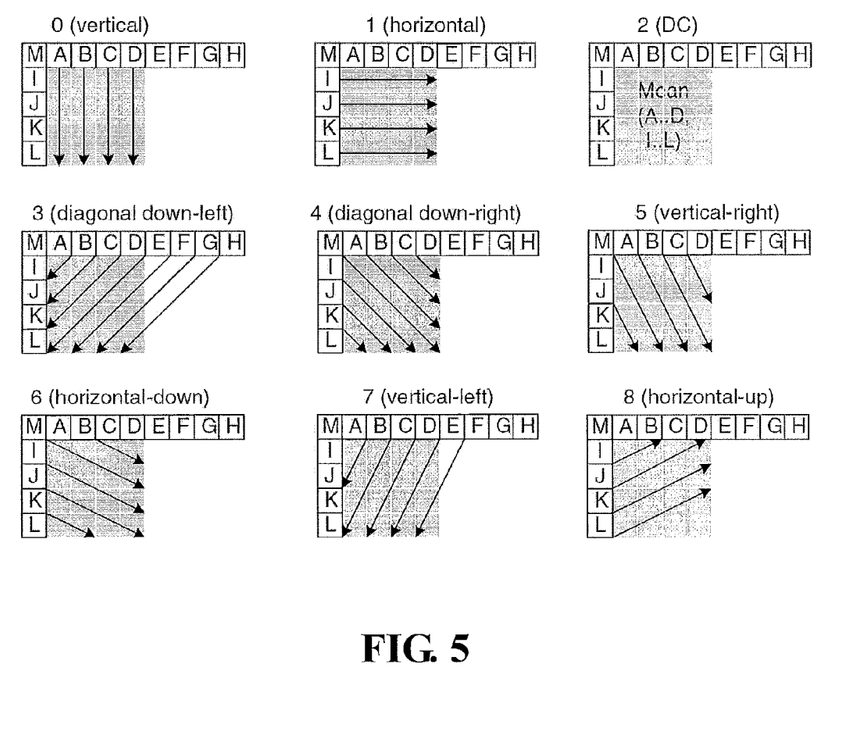
FIG. 5 is a mode chart of 4×4 luminance prediction in the embodiments of the present invention.

FIG. 4 shows a 4×4 luminance block to be predictive coding, the pixels (which are labeled as A, B, . . . , M in FIG. 4) located on the left side and upper side of which have been coded and reconstructed, thereby they serve as predictive reference values in the coder. The pixel values a, b, c, . . . , p in the block to be predicted are computed according to all directions shown in FIG. 5 based on reference pixel values A, B, . . . , M. In mode 2 (DC mode), the predictive computing is performed based on all reference pixel values A, B, . . . , M; while in other modes, the computing is performed only if the required predictive pixel value is available. Therefore, the predictive values of 16 pixels corresponding to predictive block $p_{ij}$ in all valid modes are obtained.

S1200: for different valid predictive modes, the estimated residual error is calculated between the predictive block obtained in S1100 and the pixel on the position corresponding to the original block, respectively:

$$X = \begin{bmatrix} x_{00} & x_{01} & x_{02} & x_{03} \\ x_{10} & x_{11} & x_{12} & x_{13} \\ x_{20} & x_{21} & x_{22} & x_{23} \\ x_{30} & x_{31} & x_{32} & x_{33} \end{bmatrix} = p_{ij} - s_{ij}, \quad 0 \leq i \leq 3, 0 \leq j \leq 3 \quad (1)$$

S1300: for different valid predictive modes, performing estimation based on the estimated residual error value, and predicting the numbers of zero coefficients and ±1 coefficients comprised in 4×4 block respectively after DCT and quantification during practical coding; the traditional computing of 4×4 forward DCT transformation is shown as follows:

$$Y = \quad (2)$$

$$AXA^T = \begin{bmatrix} a & a & a & a \\ b & c & -c & -b \\ a & -a & -a & a \\ c & -b & b & -c \end{bmatrix} \begin{bmatrix} x_{00} & x_{01} & x_{02} & x_{03} \\ x_{10} & x_{11} & x_{12} & x_{13} \\ x_{20} & x_{21} & x_{22} & x_{23} \\ x_{30} & x_{31} & x_{32} & x_{33} \end{bmatrix} \begin{bmatrix} a & b & a & c \\ a & c & -a & -b \\ a & -c & -a & b \\ a & -b & a & -c \end{bmatrix}$$

Wherein A is a transformation matrix, and corresponding items are a=½, b=$\sqrt{½}$ cos(π/8), c=$\sqrt{½}$ cos(3π/8).

When the integer DCT coefficient Y(u,v), the quantization parameter $Q_p$ and the quantization coefficient Z(u,v) are given, it is represented as follows:

$$|Z(u,v)| = (|Y(u,v)| \cdot M(u,v) + f) >> q\text{bits}, \; 0 \leq u, v \leq 3 \quad (3)$$

Wherein qbits=15+floor($Q_p$/6), the value range of $Q_p$ is 0 to 51. For the intra prediction block, f=($2^{qbits}$/3). M(u, v) is a multiplication factor with respect to $Q_p$% 6, and there are three categories based on locations correspondingly, which is shown in Table 1.

TABLE 1

Quantization Coefficient Classification Table
Corresponding to Different Locations

| $Q_p\%6$ | 1st (1,1), (1,3), (3,1), (3,3) | 2nd Other locations | 3rd (0,0), (0,2), (2,0), (2,2) |
|---|---|---|---|
| 0 | 5243 | 8066 | 13107 |
| 1 | 4660 | 7490 | 11916 |
| 2 | 4194 | 6554 | 10082 |
| 3 | 3647 | 5825 | 9362 |
| 4 | 3355 | 5243 | 8192 |
| 5 | 2893 | 4559 | 7282 |

Further expanding the DCT transformation in formula (2), constructing a new transformation matrix $A_a(u,v)=[A(x,u)\cdot A(y,v)]_{4\times 4}$ correspondingly, and then the transformation expression can be replaced by the following formula:

$$\hat{Y}(u,v) = \sum_{x=0}^{3} \sum_{y=0}^{3} X_a \otimes A_a(u,v) \quad (4)$$

Wherein $X_a=[X(x,y)]_{4\times 4}$, $\otimes$ represents that each element of matrix X, is multiplied by the element in the same position of transformation matrix $A_a(u,v)$.

The formula (3) should be considered to obtain a quantized value $T(u,v)$ when determining whether the value of each element in integer DCT coefficient matrix $\hat{Y}$ is 0.

$$T(u,v) \approx \frac{2^{qbits}-f}{M(u,v)}$$

Then condition of determining that the DCT coefficient after quantization is 0 is represented as follows:

$$|\hat{Y}(u,v)|<T(u,v) \quad (5)$$

Taking u=0, v=1 as an example:

$$A_a(0,1) = \begin{bmatrix} 2 & 1 & -1 & -2 \\ 2 & 1 & -1 & -2 \\ 2 & 1 & -1 & -2 \\ 2 & 1 & -1 & -2 \end{bmatrix}$$

Since the transformation matrix $A_a(u,v)$ is regularly distributed and is highly symmetrical, it is divided into four 4×4 blocks, for example:

$$AV_0 = \sum_{x=0}^{3} X(x,0),$$

$$AV_1 = \sum_{x=0}^{3} X(x,1),$$

$$AV_2 = \sum_{x=0}^{3} X(x,2),$$

$$AV_3 = \sum_{x=0}^{3} X(x,3)$$

to further obtain:

$$\hat{Y}(0,1)=2AV_0+AV_1-AV_2-2AV_3$$

So, the condition that the DCT coefficient at the location (0,1) after quantization is 0 is as follows:

$$|\hat{Y}(0,1)|=|2AV_0+AV_1-AV_2-2AV_3|<T(0,1)$$

Similarly, for other locations in the residual error matrix, different block divisions can be performed correspondingly to different transformation matrixes respectively to perform a rapid computing, and the statistics of the number $N_{pre\_Zero}$ of zero coefficients is performed.

Certainly, the following formula $$|\hat{Y}(u,v)|>T(u,v)$$

can serve as a condition that the DCT coefficient after quantization is not 0 to determine whether all DCT coefficients after quantization are nonzero coefficients, and the statistics of the number of the nonzero coefficients is performed.

Additionally, considering the following condition of determining ±1 coefficients:

$$T(u,v) \leq |\hat{Y}(u,v)|<2T(u,v) \quad (6)$$

This condition is used to determine whether the DCT coefficients after quantization are ±1, and the statistics of the number $N_{pre\_One}$ of ±1 coefficients is performed.

S1400: for all valid predictive modes, predicting the code rate required by the block to be coded according to the coding characteristic of the Context-based Adaptive Variable Length Coding (CAVLC) together with the predicted numbers of zero coefficients and ±1 coefficients; based on the analysis of characteristic of the algorithm of CAVLC entropy coding, it is deemed that there are three important parameters affecting the coding length in CAVLC coding, they are: $N_{coeff}$, $N_{one}$ and $N_{zero}$, wherein $N_{coeff}$ represents the number of nonzero coefficients, $N_{one}$ represents the number of ±1 coefficients, and $N_{Zero}$ represents the number of zero coefficients after the first nonzero coefficient. From CAVLC code table, it can be seen that the bigger the value of $N_{Coeff}$ is, the more the code words will be generated correspondingly, while the bigger the value of $N_{Zero}$ is, the less the corresponding code words will be. Therefore, we could consider corresponding $N_{Coeff}$ and $N_{Zero}$, as a whole unit. In order to estimate the bit number of the corresponding block obtained by CAVLC coding, the following coefficient formula to be fitted is constructed:

$$\text{actual\_rate}=a\times N_{Coeff}+b\times N_{One}+\text{rate\_mode} \quad (7)$$

Wherein rate_mode equals to 1 for most probable predictive mode, and equals to 4 for other modes.

By using n given triad ($N_{Coeff}$, $N_{one}$, actual_rate), the coefficient fitting to the coefficient formula to be fitted is performed to obtain coefficients a and b to be fitted, and to further obtain an estimated rate of the block to be coded. For instance, several sequences of practical coding are adopted, two coefficients to be determined are obtained first as reference coefficient values of the estimated rate formula: five general test sequences and three video clips collected in practical are used for testing, and after using CAVLC to code, the statistics of the numbers of the required nonzero coefficients and ±1 coefficients, and actual code rate corresponding to each 4×4 luminance block are performed, and by using a method of least square fitting, the correspondingly best fitting coefficients a=6.3, b=−2.3 can be obtained, thereby the following estimated rate formula is obtained:

$$\text{rate\_pre}=[6.3\times(16-N_{pre\_Zero})-2.3\times N_{pre\_One}+\text{rate\_mode}]$$

Wherein rate_pre represents the estimated rate to be encoded, $N_{pre\_Zero}$ and $N_{Pre\_One}$ respectively represent the estimated numbers of zero coefficients and ±1 coefficients in the quantified transformation coefficient of the block to be predictive coding obtained in S1300. The estimated rate fitting coefficients of all valid predictive modes obtained by this means are the same with each other.

Certainly, the fitting coefficient value can be determined by using an adaptive manner based on the characteristics of the sequences themselves during coding to obtain the estimated rate of the block to be coded, and it is unnecessary to obtain the coefficient to be fitted first and to make it serve as an experience reference value. The estimated rate fitting coefficients of all valid predictive modes obtained by means of an adaptive way may be different from each other.

S1500: for all valid predictive modes, constructing a rate distortion cost function based on the estimated rate to be encoded by using SAD of the block to be coded to estimate the intra prediction residual error and the estimated rate of the block to be coded:

$$RDCost\_modified = SAD + rate\_pre \cdot \lambda_{MODE}$$

$$= \sum_{i=0}^{3} \sum_{j=0}^{3} |s_{ij} - p_{ij}| +$$

$$[6.3 \times (16 - N_{pre\_zero}) -$$

$$2.3 \times N_{pre\_One} + rate\_mode] \cdot \lambda_{MODE}$$

Additionally, if the estimated rate to be encoded uses an adaptive way to determine the fitting coefficient, the fitting coefficients in a rate distortion cost function based on an estimated rate to be encoded constructed in all valid predictive modes may be different from each other.

S1600: using the rate distortion cost function based on the estimated rate to be encoded obtained in S1500 to respectively compute the rate distortion costs for all valid predictive modes, and thereby selecting the mode due to which the rate distortion cost is minimum as the best mode of intra prediction coding.

$$Mode\_best = Mode(\min RDCost\_modified)$$

Wherein if the fitting coefficients in the rate distortion cost function constructed in all valid predictive modes are the same with each other, i.e., an identical rate distortion cost function is constructed for all valid modes, thereby this identical rate distortion cost function is used to respectively compute the rate distortion costs for all valid modes; if the fitting coefficients in the rate distortion cost function constructed in all valid predictive modes are different from each other, corresponding rate distortion cost functions are constructed for all valid modes, thereby the rate distortion costs for all valid modes are respectively computed by respectively corresponding rate distortion cost functions.

Figure 6:
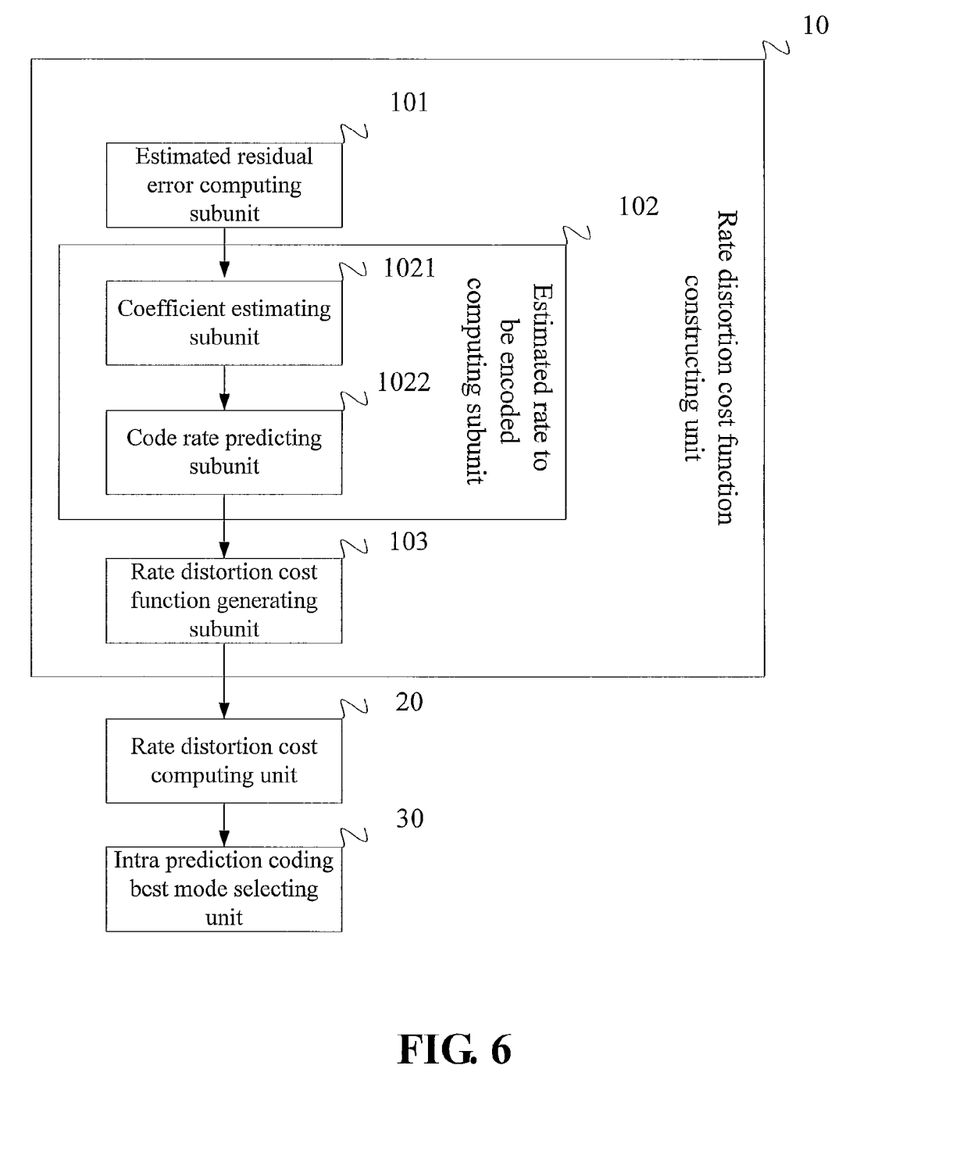
FIG. 6 is a structure diagram of a device for selecting the best mode of intra prediction coding for video coding in the present invention.

As shown in FIG. 6, the present invention further provides a device for selecting the best mode of intra prediction coding for video coding, including:

a rate distortion cost function constructing unit 10 for constructing a rate distortion cost function based on an estimated rate to be encoded;

a rate distortion cost computing unit 20 for computing the rate distortion costs for all predictive modes based on the rate distortion cost function constructed by the rate distortion cost function constructing unit 10;

an intra prediction coding best mode selecting unit 30 for selecting a predictive mode with the minimum rate distortion cost as the best mode of intra prediction coding based on the computing result of the rate distortion cost computing unit 20.

Further, the rate distortion cost function constructing unit 10 specifically includes:

an estimated residual error computing subunit 101 for computing to estimate residual error after the intra prediction of the block to be coded;

an estimated rate to be encoded computing subunit 102 for computing the estimated rate of the block to be coded;

a rate distortion cost function generating subunit 103 for constructing a rate distortion cost function based on the estimated rate to be encoded by using the estimated residual error of the block to be coded obtained by the computation of the estimated residual error computing subunit 101 as the distortion measurement, together with the estimated rate of the block to be coded obtained by the computation of the estimated rate to be encoded computing subunit 102.

Further, the estimated rate to be encoded computing subunit 102 specifically includes:

a coefficient estimating subunit 1021 for estimating numbers of zero coefficients and ±1 coefficients comprised in the coefficients of the block to be coded after DCT and quantification during practical coding, based on the estimated residual error of the block to be coded obtained by the computation of the estimated residual error computing subunit 101;

a code rate predicting subunit 1022 for predicting the estimated rate of the block to be coded according to the characteristic of the Context-based Adaptive Variable Length Coding (CAVLC) method together with the numbers of zero coefficients and ±1 coefficients estimated by the coefficient estimating subunit 1021.

Obviously, a person skilled in the art may modify or change the present invention within the spirit and scope of the present invention. Thus, if the modifications or changes for the present invention are within the scopes of the claims of the present invention and equal techniques, the present invention would like to include these modifications and changes.

The invention claimed is:

1. A method for selecting the best mode of intra prediction coding for video coding, comprising the steps of:

obtaining an estimated residual error corresponding to a block to be coded by subtracting each pixel value in a predictive block from an original pixel value on a corresponding position in the block to be coded;

obtaining DCT coefficients corresponding to each pixel in the block to be coded by performing DCT to the estimated residual error;

comparing the obtained DCT coefficient corresponding to each of the pixels in the block to be coded with a value on a corresponding position in a Quantization Coefficient Classification Table, determining that the DCT coefficient after quantization is zero coefficient when an absolute value of the DCT coefficient is smaller than the value on the corresponding position in the Quantization Coefficient Classification Table, and determining that the DCT coefficient after quantization is ±1 coefficient when the absolute value of the DCT coefficient is bigger than or equal to the value on the corresponding position in the Quantization Coefficient Classification Table and smaller than double of the value on the corresponding position in the Quantization Coefficient Classification Table;

determining an estimated rate of the block to be coded by linearity fitting according to a characteristic of a Context-based Adaptive Variable Length Coding method and the determined number of pixels of which the DCT coefficient after quantization is zero coefficient and the determined number of pixels of which the DCT coefficient after quantization is ±1 coefficient in the block to be coded;

constructing a rate distortion cost function based on the estimated rate of the block to be encoded by using the estimated residual error corresponding to the block to be coded as distortion measurement;

computing rate distortion costs for all predictive modes by using the constructed function; and selecting a predictive mode with the minimum rate distortion cost as the best mode of intra prediction coding according to computing results.

2. The method according to claim 1, wherein the predictive mode is a valid predictive mode.

3. A device for selecting the best mode of intra prediction for video coding, comprising:

a rate distortion cost function constructing unit;

a rate distortion cost computing unit; and an intra prediction coding best mode selecting unit, wherein:

the rate distortion cost function constructing unit comprises an estimated residual error computing subunit, an estimated rate to be encoded computing subunit and a rate distortion cost function generating subunit, wherein the estimated residual error computing subunit is operative for obtaining an estimated residual error corresponding to a block to be coded by subtracting each pixel value in a predictive block from an original pixel value on a corresponding position in the block to be coded;

the estimated rate to be encoded computing subunit comprises a coefficient estimating subunit and a code rate predicting subunit, wherein the coefficient estimating subunit is operative for:

obtaining DCT coefficients corresponding to each pixel in the block to be coded by performing DCT to the estimated residual error obtained by the estimated residual error computing subunit; and comparing the obtained DCT coefficient corresponding to each pixel in the block to be coded with a value on a corresponding position in a Quantization Coefficient Classification Table, determining that the DCT coefficient after quantization is zero coefficient when an absolute value of the DCT coefficient is smaller than the value on the corresponding position in the Quantization Coefficient Classification Table, and determining that the DCT coefficient after quantization is ±1 coefficient when the absolute value of the DCT coefficient is bigger than or equal to the value on the corresponding position in the Quantization Coefficient Classification Table and smaller than double of the value on the corresponding position in the Quantization Coefficient Classification Table;

the code rate predicting subunit is operative for determining an estimated rate of the block to be coded by linearity fitting according to a characteristic of a Context-based Adaptive Variable Length Coding method and the determined number of pixels of which the DCT coefficient after quantization is zero coefficient and the determined number of pixels of which the DCT coefficient after quantization is ±1 coefficient in the block to be coded;

a rate distortion cost function constructing unit the rate distortion cost function generating subunit is operative for constructing a rate distortion cost function based on the estimated rate of the block to be encoded by using the estimated residual error corresponding to the block to be coded as a distortion measurement;

the rate distortion cost computing unit is operative for computing rate distortion costs for all predictive modes based on the rate distortion cost function constructed by the rate distortion cost function generating subunit of the rate distortion cost function constructing unit; and the intra prediction coding best mode selecting unit is operative for selecting a predictive mode with the minimum rate distortion cost as the best mode of intra prediction coding based on computing results of the rate distortion cost computing unit.

4. The device according to claim 3, wherein the predictive mode is a valid predictive mode.

* * * * *

UNITED STATES PATENT AND TRADEMARK OFFICE
CERTIFICATE OF CORRECTION

PATENT NO.       : 8,406,286 B2
APPLICATION NO.  : 12/671048
DATED            : March 26, 2013
INVENTOR(S)      : Liu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 539 days.

Signed and Sealed this
First Day of September, 2015

Michelle K. Lee
*Director of the United States Patent and Trademark Office*